(12) United States Patent
Sawada et al.

(10) Patent No.: US 11,276,861 B2
(45) Date of Patent: Mar. 15, 2022

(54) POSITIVE ELECTRODE FOR AIR BATTERY

(71) Applicant: Panasonic Intellectual Property Management Co., Ltd., Osaka (JP)

(72) Inventors: Koichi Sawada, Hyogo (JP); Tsutomu Kawashima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 258 days.

(21) Appl. No.: 16/391,375

(22) Filed: Apr. 23, 2019

(65) Prior Publication Data

US 2019/0252688 A1 Aug. 15, 2019

Related U.S. Application Data

(63) Continuation of application No. PCT/JP2018/033903, filed on Sep. 13, 2018.

(30) Foreign Application Priority Data

Nov. 16, 2017 (JP) .............................. JP2017-221225
Jan. 17, 2018 (JP) .............................. JP2018-005922
Aug. 28, 2018 (JP) .............................. JP2018-159155

(51) Int. Cl.
  *H01M 4/66* (2006.01)
  *H01M 12/08* (2006.01)
  (Continued)

(52) U.S. Cl.
  CPC .............. *H01M 4/663* (2013.01); *H01M 4/74* (2013.01); *H01M 10/058* (2013.01);
  (Continued)

(58) Field of Classification Search
  CPC .......... H01M 4/663; H01M 4/74; H01M 4/75; H01M 12/06
  See application file for complete search history.

(56) References Cited

U.S. PATENT DOCUMENTS 6,368,751 B1 * 4/2002 Yao ...................... H01M 4/8882
                                                429/235
8,785,079 B1 * 7/2014 Gross ................... H01M 4/8621
                                                429/532
(Continued)

FOREIGN PATENT DOCUMENTS

CN            1378708 A       11/2002
CN          101584063 A       11/2009
(Continued)

OTHER PUBLICATIONS

The Extended European Search Report dated Nov. 25, 2020 for the related European Patent Application No. 18871826.6.
(Continued)

*Primary Examiner* — Maria Laios
*Assistant Examiner* — Jordan E Berresford
(74) *Attorney, Agent, or Firm* — McDermott Will and Emery LLP (57) ABSTRACT

A positive electrode for an air battery includes a current collector and a porous layer including an electroconductive material. The current collector includes a base having a first major surface, and a plurality of projections disposed on at least the first major surface of the base. The first major surface of the base is a planar surface. The porous layer is disposed on the first major surface of the base and is in direct contact with the first major surface. The projections are in direct contact with the porous layer in the interior of the porous layer.

11 Claims, 3 Drawing Sheets

(51) Int. Cl.
*H01M 12/06* (2006.01)
*H01M 10/058* (2010.01)
*H01M 4/74* (2006.01)
*H01M 4/02* (2006.01)

(52) U.S. Cl.
CPC .......... *H01M 12/06* (2013.01); *H01M 12/08* (2013.01); *H01M 2004/021* (2013.01); *H01M 2004/028* (2013.01)

(56) References Cited

U.S. PATENT DOCUMENTS

| | | | | |
|---|---|---|---|---|
| 9,190,674 | B2* | 11/2015 | Ozaki | H01M 8/0247 |
| 2005/0019642 | A1* | 1/2005 | Hishitani | H01M 8/0232 |
| | | | | 429/465 |
| 2008/0118832 | A1* | 5/2008 | Artman | H01M 4/663 |
| | | | | 429/209 |
| 2009/0297906 | A1 | 12/2009 | Harada | |
| 2013/0052547 | A1* | 2/2013 | Ogino | H01M 4/96 |
| | | | | 429/406 |
| 2014/0057182 | A1* | 2/2014 | DeJonghe | H01M 12/06 |
| | | | | 429/405 |
| 2014/0147755 | A1 | 5/2014 | Hirose et al. | |

FOREIGN PATENT DOCUMENTS

| | | |
|---|---|---|
| CN | 102969547 A | 3/2013 |
| JP | 2001-123288 A | 5/2001 |
| JP | 2014-017230 | 1/2014 |

OTHER PUBLICATIONS

International Search Report of PCT application No. PCT/JP2018/033903 dated Oct. 30, 2018.

English Translation of Chinese Search Report dated Nov. 1, 2021 for the related Chinese Patent Application No. 201880003241.8.

* cited by examiner

POSITIVE ELECTRODE FOR AIR BATTERY

BACKGROUND

1. Technical Field

The present disclosure relates to a positive electrode for an air battery and to an air battery.

2. Description of the Related Art

An air battery offers advantages such as a high energy density (amount of dischargeable electric energy relative to weight) and easy miniaturization and weight reduction. As such, air batteries are attracting attention as battery cells having an energy density greater than the energy density of a metal ion cell that is currently considered to have the highest energy density.

Air batteries include a positive electrode, a negative electrode, and an electrolyte disposed between the positive electrode and the negative electrode. The positive electrode includes, for example, a porous member and a current collector. Typically, a carbon material is used in the porous member. A metal mesh, an expanded metal, or the like, for example, is used in the current collector.

For example, Japanese Unexamined Patent Application Publication No. 2014-017230 discloses a positive electrode for an air battery that includes porous carbon, which is used in the positive electrode layer, and a positive electrode current collector in the form of, for example, a foil, sheet, or mesh.

SUMMARY

One non-limiting and exemplary embodiment of the present disclosure provides a positive electrode for an air battery that enables realization of an air battery having both a high discharge capacity and a high gravimetric energy density.

In one general aspect, the techniques disclosed here feature a positive electrode for an air battery. The positive electrode includes a current collector and a porous layer including an electroconductive material. The current collector includes a base having a first major surface, and a plurality of projections disposed on at least the first major surface of the base. The first major surface of the base is a planar surface. The porous layer is disposed on the first major surface of the base and is in direct contact with the first major surface. The projections are in direct contact with the porous layer in an interior of the porous layer.

According to one general aspect of the present disclosure, a positive electrode for an air battery enables realization of an air battery having both a high discharge capacity and a high gravimetric energy density.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

An air battery is a battery cell using, as a positive electrode active material, oxygen from air and using, as a negative electrode active material, a metal or a metal compound capable of occluding and releasing metal ions. Positive electrodes formed of porous carbon and a positive electrode current collector such as disclosed in Japanese Unexamined Patent Application Publication No. 2014-017230 do not have a sufficient discharge capacity or a sufficient gravimetric energy density. Japanese Unexamined Patent Application Publication No. 2014-017230 discloses a coating method and a pressure-bonding method as methods for forming a positive electrode having the configuration described above. In the coating method, a coating formulation in which a composition including porous carbon, a binder, and the like is dispersed in a solvent is coated onto a positive electrode current collector. In the pressure-bonding method, the composition is pressure-bonded to the positive electrode current collector. The present inventors newly discovered that positive electrodes formed by using such methods have problems such as described below.

The coating method described above poses a problem in that the composition undergoes large deformation due to evaporation of the solvent included in the coating formulation, and as a result, it is not easy to achieve sufficient adhesion between the positive electrode current collector and the porous carbon. If adhesion between the positive electrode current collector and the porous carbon is insufficient, collection of current becomes unstable and therefore discharge voltage decreases, and consequently, achieving a sufficient gravimetric energy density is difficult. The pressure-bonding method described above poses a problem in that, when the composition is pressure-bonded onto the positive electrode current collector, the pressure causes many of the pores of the porous carbon to disappear. Disappearance of pores in the porous carbon results in a reduced discharge capacity and in unstable current collection, which decreases the discharge voltage and decreases the gravimetric energy density.

In view of the above, the present inventors diligently performed studies on air batteries and positive electrodes for air batteries that enable realization of both a high discharge capacity and a high gravimetric energy density, and consequently, arrived at a positive electrode for an air battery and an air battery according to the present disclosure, which are described below.

Overview of One Aspect According to the Present Disclosure

According to a first aspect of the present disclosure, a positive electrode for an air battery includes a current collector and a porous layer including an electroconductive material. The current collector includes a base and a plurality of projections disposed on at least a first major surface of the base. The first major surface of the base is a planar surface. The porous layer is disposed on the first major surface of the base and is in direct contact with the first major surface. The projections are in direct contact with the porous layer in the interior of the porous layer.

The current collector of the positive electrode according to the first aspect includes the plurality of projections disposed on at least the first major surface of the base. The projections are in direct contact with the porous layer in the interior of the porous layer, the porous layer being disposed on the first major surface of the base. In other words, the positive electrode according to the first aspect has a structure in which the projections, which are constituents of the current collector, extend into the porous layer. Furthermore, the porous layer is in direct contact with the first major surface, which is a planar surface. Wth this structure, the porous layer is present in spaces between the projections, which are constituents of the current collector, and therefore the current collector and the porous layer are adhered to each other three-dimensionally. As a result, a current collection efficiency can be improved, and the reaction area can be increased, and therefore a high gravimetric energy density can be realized. In addition, since the current collector includes the projections, even when the method of integrating the porous layer and the current collector together by, for example, pressure bonding is selected as the method for forming the positive electrode, the pressure to which the porous layer is subjected during pressure bonding is partially received by the projections. As a result, disappearance of pores included in the porous layer can be reduced. In addition, pressure applied to the porous layer while assembling an air battery with the positive electrode according to the first aspect and pressure applied to the porous layer due to the internal pressure of the air battery can also be reduced, at least partially, by virtue of the projections. As a result, disappearance of pores included in the porous layer can be reduced during assembly of a cell and even after incorporation into the cell. Consequently, the positive electrode, which includes the current collector including the projections described above, enables realization of a high discharge capacity for an air battery. Consequently, the positive electrode according to the first aspect enables realization of both a high discharge capacity and a high gravimetric energy density.

In a second aspect, the positive electrode according to the first aspect may be as follows, for example. The base may include at least one opening, and the projections may be disposed on regions other than the opening on the first major surface.

In the positive electrode according to the second aspect, the base of the current collector includes an opening, and as a result, a current collection efficiency is improved and a supply of oxygen is facilitated. Consequently, with the positive electrode according to the second aspect, the amount of deposition of discharge products can be increased to further improve a discharge capacity and a gravimetric energy density.

In a positive electrode according to a third aspect, the porous layer of the positive electrode according to the first or second aspect may have a porosity of 86% or greater and 99% or less, for example.

In the positive electrode according to the third aspect, the porous layer has a porosity of 86% or greater and 99% or less. Combining the porous layer having such a porosity with the current collector including the projections described above effectively improves a discharge capacity per unit area. Consequently, the positive electrode according to the third aspect enables realization of an air battery having a high discharge capacity per unit area.

In a fourth aspect, the positive electrode according to any one of the first to third aspects may be as follows, for example. The porous layer may include first pores each having a pore diameter of 4 nm or greater and less than 100 nm and second pores each having a pore diameter of 100 nm or greater and 10 μm or less. A second pore volume may be greater than a first pore volume. The second pore volume is a cumulative pore volume of the second pores, and the first pore volume is a cumulative pore volume of the first pores.

The positive electrode according to the fourth aspect ensures a large number of paths for oxygen to diffuse into the positive electrode and a large number of storage spaces for discharge products produced in the discharge reaction. Consequently, in the positive electrode according to the fourth aspect, the amount of deposition of discharge products can be increased while inhibiting blockage in the porous layer due to discharge products. As a result, the positive electrode according to the fourth aspect increases the discharge capacity per unit area of an air battery.

In a fifth aspect, the positive electrode according to the fourth aspect may be as follows, for example. The first pore volume may be 0.59 $cm^3/g$ or greater and less than 2.99 $cm^3/g$.

The positive electrode according to the fifth aspect can have a large number of reaction areas for the electrochemical reaction. As such, the positive electrode according to the fifth aspect facilitates activation of oxygen and therefore enables realization of an air battery with a high capacity.

In a sixth aspect, the positive electrode according to any one of the first to fifth aspects may be as follows, for example. The porous layer may include a carbon material as the electroconductive material and a polymeric material.

In the positive electrode according to the sixth aspect, the porous layer can retain a large number of areas where oxygen can react. As such, in the positive electrode according to the sixth aspect, the amount of deposition of discharge products can be increased to further increase a discharge capacity.

In a seventh aspect, the positive electrode according to any one of the first to sixth aspects is as follows, for example. A total area of transverse cross sections of the plurality of projections is 2.0% or greater and 7.0% or less of an area of a transverse cross section of the porous layer. Here, the total area of the transverse cross sections of the projections is equal to a sum of areas of respective cross sections of the plurality of projections taken along a plane perpendicular to a stacking direction of the base of the current collector and the porous layer, and the area of the transverse cross section of the porous layer is equal to an area determined by an outer perimeter of a cross section of the porous layer taken along the plane. The area determined by the outer perimeter of the porous layer is an area determined based on an outermost shape of the porous layer defined by the cross section of the porous layer taken along the plane. The area does not exclude the areas of the pores included within the porous layer. Here, the above-mentioned transverse cross sections of the projections are cross sections of the projections perpendicular to the stacking direction of the base and the porous layer. Furthermore, the transverse cross section of the porous layer is a cross section of the porous layer perpendicular to the stacking direction of the base and the porous layer. Furthermore, in the case that the shape and/or size of the transverse cross sections of the projections vary in the stacking direction, the plane used for determining the total area of the transverse cross sections of the projections and the area of the transverse cross section of the porous layer is a plane containing a position that is a distance of 5% of the thickness of the porous layer away from the interface of the base and the porous layer toward the porous layer.

In the positive electrode according to the seventh aspect, sufficient three-dimensional contact between the positive electrode current collector and the porous layer is ensured, and the reduction in the volume of the porous member due to the presence of the projections is limited to a low level. Since sufficient three-dimensional contact between the positive electrode current collector and the porous layer is ensured, a current collection efficiency is improved, and as a result, the reaction area can be increased. In addition, since the reduction in the volume of the porous member is limited to a low level, a sufficient supply of oxygen to the positive electrode can be realized, and sufficient space for storing discharge products produced in the discharge reaction can be ensured. As a result of these, a discharge capacity and a gravimetric energy density can be further improved.

In an eighth aspect, the positive electrode according to any one of the first to seventh aspects may be as follows, for example. The projections may extend through and beyond the porous layer.

In the positive electrode according to the eighth aspect, the projections can sufficiently reduce, for example, pressure applied to the porous layer when the integration of the positive electrode current collector with the porous layer is performed by pressure bonding, pressure applied to the porous layer during assembly of an air battery, and pressure applied to the porous layer due to the internal pressure of an air battery. Consequently, the positive electrode according to the eighth aspect can realize further improvement in discharge capacity because many of the pores within the porous layer are retained without collapsing.

In a ninth aspect, the positive electrode according to any one of the first to eighth aspects may be as follow, for example. The current collector may further include a side wall provided along a perimeter of the first major surface of the base, and a height of the side wall may be greater than a height of the projections. Here, the height of the projections corresponds to a length of the projections from the plane containing the first major surface of the base in a direction perpendicular to the plane. The height of the side wall corresponds to a length of the side wall from the plane containing the first major surface of the base in a direction perpendicular to the plane.

In the positive electrode according to the ninth aspect, the current collector further includes the side wall having a height greater than the height of the projections. The side wall can further reduce the pressure applied to the porous layer. In addition, the side wall prevents breakage of the projections. Consequently, the positive electrode according to the ninth aspect can realize further improvement in discharge capacity because the pores within the porous layer are retained more reliably.

According to a tenth aspect of the present disclosure, an air battery includes the positive electrode according to any one of the first to ninth aspects, a negative electrode that occludes and releases metal ions, and an electrolyte filling the space between the positive electrode and the negative electrode.

The air battery according to the tenth aspect includes the positive electrode according to any one of the first to ninth aspects, and as a result, the air battery has both a high discharge capacity and a high gravimetric energy density.

In an eleventh aspect, for example, the air battery according to the tenth aspect may further include a separator disposed between the positive electrode and the negative electrode, the separator may be disposed at least partially within the electrolyte, and at least one or more of the plurality of projections may be in direct contact with the separator.

The air battery according to the eleventh aspect includes the separator and is therefore highly safe.

In a twelfth aspect, the air battery according to the tenth or eleventh aspect is as follows, for example. The electrolyte is a non-aqueous electrolyte solution.

The air battery according to the twelfth aspect has a high voltage and has a high gravimetric energy density.

EMBODIMENTS

Embodiments of an air battery and a positive electrode for an air battery, of the present disclosure, will be described in detail below. The embodiments described below are merely illustrative, and the present disclosure is not limited to the embodiments described below.

An air battery of the present embodiment includes a positive electrode for an air battery (hereinafter referred to as "positive electrode"), a negative electrode capable of occluding and releasing metal ions, and an electrolyte disposed between the positive electrode and the negative electrode. The positive electrode includes a current collector and a porous layer including an electroconductive material. The porous layer is provided as a positive electrode layer that uses oxygen from air as a positive electrode active material and is capable of oxidizing and reducing oxygen. The current collector collects current from the porous layer. The negative electrode includes a negative electrode layer capable of occluding and releasing metal ions. The negative electrode may further include a negative electrode current collector that collects current from the negative electrode layer. The air battery of the present embodiment may further include a separator disposed between the positive electrode and the negative electrode.

In the positive electrode of the present embodiment, the current collector includes a base and a plurality of projections disposed on at least the first major surface of the base. The first major surface of the base is a planar surface. The base may be in the form of a flat sheet. That is, the base may have the first major surface and a second major surface opposite to the first major surface, and the second major surface may be a planar surface. The second major surface may not be a planar surface. The following describes a base in the form of a flat sheet. The porous layer is disposed on the first major surface of the base. The projections are in direct contact with the porous layer in the interior of the porous layer. In other words, the positive electrode has a structure in which the projections, which are constituents of the current collector, extend into the porous layer. In the present embodiment, the projections are portions that project from the first major surface of the flat-sheet-form base in a direction toward the porous layer and each of which has, for example, a columnar shape.

Figure 1:
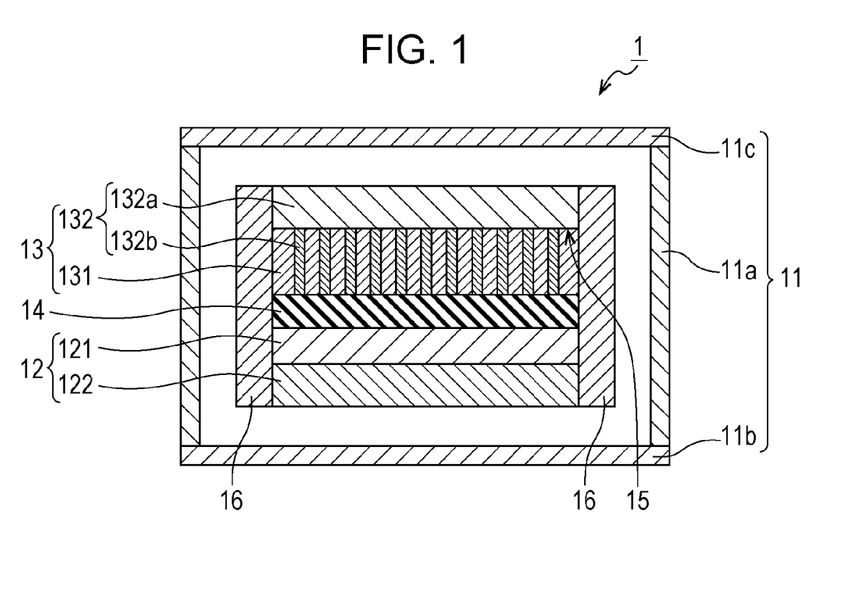
FIG. 1 is a schematic cross-sectional view illustrating an exemplary configuration of an air battery according to the present disclosure.

FIG. 1 is a schematic cross-sectional view of an exemplary configuration of the air battery described above.

An air battery 1, illustrated in FIG. 1, includes a cell case 11, a negative electrode 12, a positive electrode 13, and an electrolyte 14. The electrolyte 14 is disposed between the negative electrode 12 and the positive electrode 13. The cell case 11 includes a tubular portion 11a, a bottom portion 11b, and a cover portion 11c. The tubular portion 11a has open ends at the top and the bottom. The bottom portion 11b is provided to close the open end at the bottom of the tubular portion 11a. The cover portion 11c is provided to close the open end at the top of the tubular portion 11a. Although not illustrated in the drawings, the cell case 11 has a constituent for intake of air into the interior. For example, the cover portion 11c may be provided with an air intake port for taking air into the cell case 11. The negative electrode 12 includes a negative electrode layer 121 and a negative electrode current collector 122. The negative electrode layer 121 is disposed adjacent to the negative electrode current collector 122, on the side adjacent to the electrolyte 14. The positive electrode 13 includes a porous layer 131 and a positive electrode current collector 132. The porous layer 131 is disposed adjacent to the positive electrode current collector 132, on the side adjacent to the electrolyte 14. The porous layer 131 includes an electroconductive material and serves as a positive electrode layer. The positive electrode current collector 132 includes a base 132a, which is in the form of a flat sheet, and a plurality of projections 132b, each of which has a columnar shape. The projections 132b are disposed on a first major surface 15 of the base 132a. Although not illustrated in the drawings, the base 132a of the positive electrode current collector 132 is provided with an air intake port for taking air into the porous layer 131. When the base 132a has an opening, for example, the opening can serve as the air intake port. A frame 16 is provided on the side surfaces of the layered structure including the negative electrode 12, the electrolyte 14, and the positive electrode 13. Although not illustrated in the drawings, the air battery 1 may further include a separator included in the electrolyte 14.

A lithium-air battery will now be described. The lithium-air battery is an example of the air battery of the present embodiment. The air battery of the present embodiment, however, is not limited to a lithium-air battery and may be an air battery using a metal other than lithium.

In the case that the air battery of the present embodiment is a lithium-air battery, the cell reaction is as follows.

Discharge Reaction (During Use of Cell)

$$\text{Negative electrode: } 2Li \rightarrow 2Li^+ + 2e^- \quad (1)$$

$$\text{Positive electrode: } 2Li^+ + 2e^- + O_2 \rightarrow Li_2O_2 \quad (2)$$

Charge Reaction (During Charging of Cell)

$$\text{Negative electrode: } 2Li^+ + 2e^- \rightarrow 2Li \quad (3)$$

$$\text{Positive electrode: } Li_2O_2 \rightarrow 2Li^+ + 2e^- + O_2 \quad (4)$$

As indicated by formulae (1) and (2), during discharging, the negative electrode releases electrons and lithium ions, whereas the positive electrode collects electrons while allowing oxygen, taken in from outside the cell, to react with lithium ions to produce lithium peroxide. In the instance of a lithium-air battery, the lithium peroxide is the discharge product. As indicated by formulae (3) and (4), during charging, the negative electrode collects electrons and lithium ions, whereas the positive electrode releases electrons, lithium ions, and oxygen. In the air battery, a lithium-containing metal oxide (e.g. $Li_2O$) other than lithium peroxide may be produced as a discharge product.

Next, the constituents of such an air battery will be described in detail.

1. Positive Electrode

As described above, the positive electrode includes the positive electrode current collector and the porous layer including an electroconductive material. As described above, the porous layer serves as a positive electrode layer that uses oxygen from air as a positive electrode active material and is capable of oxidizing and reducing oxygen. Each of the porous layer and the positive electrode current collector will be described below.

(1) Porous Layer

The porous layer uses oxygen from air as a positive electrode active material and includes a material capable of oxidizing and reducing oxygen. As such a material, a carbon-containing electroconductive porous member is included in the porous layer of the present embodiment. Carbon materials that may be used as such a porous member may have high electron conductivity. Specific examples of such carbon materials may include carbon materials typically used as a conductive agent, such as acetylene black and Ketjen black. Among such carbon materials, electroconductive carbon black, such as Ketjen black, may be used from the standpoint of specific surface area. The specific surface area of the carbon material may be, for example, 800 m²/g to 2000 m²/g or 1200 m²/g to 1600 m²/g. The DBP (dibutyl phthalate) oil absorption of the carbon material may be 150 mL/100 g to 600 mL/100 g or may be 300 mL/100 g to 500 mL/100 g. When the specific surface area and the DBP oil absorption of the carbon material are within such ranges, the porous layer having a characteristic pore structure, which will be described later, can be easily formed. Here, the specific surface area is equal to the value measured using the BET method. The DBP oil absorption can be measured in accordance with JIS standard JIS K 6217-4.

The porosity of the porous layer may be 86% or greater and 99% or less. The porosity of the porous layer may be 88% or greater or 89% or greater. The porosity of the porous layer may be 95% or less or 90% or less. When the porous layer has such a porosity, diffusion of oxygen and ions can be facilitated in the porous layer. As a result, ions and oxygen are efficiently supplied to the porous layer, which improves a discharge capacity. The porosity of the porous layer can be determined by using the apparent volume of the porous layer, the mass of the porous layer, and the true density of the material that forms the porous layer. The apparent volume of the porous layer is a volume that includes the volume of the pores included within the porous layer. Accordingly, the apparent volume of the porous layer can be determined by the thickness of the porous layer and the apparent area, which is determined by the outer perimeter of a major surface of the porous layer.

The porous layer may include pores each having a pore diameter of 4 nm or greater and 10 μm or less. Here, pores each having a pore diameter of 4 nm or greater and less than 100 nm are designated as first pores, and pores each having a pore diameter of 100 nm or greater and 10 μm or less are designated as second pores. Furthermore, the cumulative pore volume of the first pores is designated as a first pore volume, and the cumulative pore volume of the second pores is designated as a second pore volume. In the present embodiment, in the porous layer, the second pore volume may be greater than the first pore volume. That is, the pore volumes in the porous layer may be such that the proportion of the second pores, which have larger pore diameters, is greater than the proportion of the first pores, which have smaller pore diameters.

It is sufficient that the porous layer include the porous member described above; however, the porous layer may further include a binder for securing the porous member. The binder may be a material known in the art as a binder for a positive electrode layer of an air battery. Examples of such materials include polymeric materials, such as polyvinylidene fluoride (PVDF) and polytetrafluoroethylene (PTFE). Although not particularly limited, the content of the binder in the porous layer may be, for example, within a range of 1 mass % to 40 mass %.

The thickness of the porous layer varies depending on the intended use and the like of the air battery and is therefore not particularly limited. For example, the thickness may be within a range of 2 µm to 500 µm or within a range of 5 µm to 300 µm.

The method for forming the porous layer may be, for example, the method described below. For example, a film is formed from a coating formulation in which a material for the porous member that forms the porous layer, a binder, and a sublimation powder are dispersed in a solvent. The film is subjected to heat treatment to remove the sublimation powder and the solvent. As a result, a porous film including pores having the desired pore diameters is formed. The porous film can be, for example, pressure-bonded onto the positive electrode current collector, which will be described below. By using such a method or the like, the porous layer can be produced. The sublimation powder serves as a pore-forming agent. Consequently, the porous film, produced as described above by using a sublimation powder, has the desired pore structure.

As described above, the porous layer serves as a positive electrode layer. In the positive electrode of an air battery, however, oxygen from air serves as an active material, and therefore the porous layer may be free of an active material. As such, the porous layer, from a different standpoint, can be considered to be a constituent serving as a part of the current collector, that is, a second current collector.

(2) Positive Electrode Current Collector

The positive electrode current collector collects current from the porous layer. Accordingly, the material of the positive electrode current collector is not particularly limited provided that the material is electrically conductive, and therefore the material may be a material known in the art as a material for a positive electrode current collector of an air battery. Examples of the material of the positive electrode current collector include stainless steel, nickel, aluminum, iron, titanium, and carbon.

As described above, the positive electrode current collector includes a base and a plurality of projections disposed on at least the first major surface of the base. The first major surface is a planar surface. The base and the projections may be formed from the same material, or the material from which the base is formed may be different from the material from which the projections are formed.

The base may be in the form of, for example, a foil, sheet, or the like. Furthermore, the base may include at least one opening. The base may have a mesh (e.g. grid) structure. When the base has an opening, the positive electrode current collector has an excellent current collection efficiency and an excellent ability to supply oxygen. The thickness of the base of the positive electrode current collector may be, for example, within a range of 10 µm to 1000 µm or within a range of 20 µm to 400 µm.

As described above, the projections are portions that project from the first major surface of the flat-sheet-form base in a direction toward the porous layer and each of which has, for example, a columnar shape. The projections have a height of, for example, 10% or greater and 1000% or less the thickness of the porous layer. The height of the projections corresponds to a length of the projection from the plane containing the first major surface of the base in a direction perpendicular to the plane. The height of the projections may be, for example, 30% or greater the thickness of the porous layer or 50% or greater of the thickness. Furthermore, the height of the projections may be, for example, 500% or less the thickness of the porous layer or 200% or less of the thickness.

The height of the projections may be approximately equal to the thickness of the porous layer or may be greater than the thickness of the porous layer. "The height of the projections is greater than the thickness of the porous layer" means that the projection extends through and beyond the porous layer. When the height of the projections is approximately equal to the thickness of the porous layer or the projection extends through and beyond the porous layer, many of the pores within the porous layer can be retained without collapsing even if the integration of the positive electrode current collector with the porous layer is performed by, for example, pressure bonding. The reason for this is that much of the pressure at the time of pressure bonding is received by the projections, and as a result, it is unlikely that high pressure is applied to the porous layer. Furthermore, pressure applied to the porous layer during assembly of an air battery and pressure applied to the porous layer due to the internal pressure of the air battery can also be sufficiently reduced by virtue of the projections. Consequently, a sufficient number of pores of the porous layer are retained while collection of current is reliably performed, and as a result, further improvement in discharge capacity and gravimetric energy density can be realized.

The total area of the transverse cross sections of the plurality of projections may be 2.0% or greater and 7.0% or less the area of the transverse cross section of the porous layer. Here, the total area of the transverse cross sections of the projections is equal to the sum of the areas of respective cross sections of the plurality of projections taken along a plane perpendicular to the stacking direction of the base of the current collector and the porous layer. The area of the transverse cross section of the porous layer is equal to the area determined by the outer perimeter of a cross section of the porous layer taken along the plane (i.e., plane used for determining the total area of the transverse cross sections of the projections). The area determined by the outer perimeter of the porous layer is an area determined based on an outermost shape of the porous layer defined by the cross section of the porous layer taken along the plane. The area does not exclude the areas of the pores included within the porous layer. Furthermore, in the case that the shape and/or size of the transverse cross sections of the projections vary in the stacking direction, the plane used for determining the total area of the transverse cross sections of the projections and the area of the transverse cross section of the porous layer is a plane containing a position that is a distance of 5% of the thickness of the porous layer away from the interface of the base and the porous layer toward the porous layer.

The ratio of the total area of the transverse cross sections of the plurality of projections to the area of the transverse cross section of the porous layer is within the above-mentioned range. As a result, sufficient three-dimensional contact between the positive electrode current collector and the porous layer is ensured, and the reduction in the volume of the porous member due to the presence of the projections is limited to a low level. Since sufficient three-dimensional contact between the positive electrode current collector and the porous layer is ensured, the current collection efficiency is improved, and as a result, the reaction area can be increased. In addition, since the reduction in the volume of the porous member is limited to a low level, a sufficient supply of oxygen to the positive electrode can be realized, and sufficient space for storing discharge products produced in the discharge reaction can be ensured. As a result of these, the discharge capacity and the gravimetric energy density can be improved further.

The locations and the number of the projections are not particularly limited. The projections may be disposed adjacent to the perimeter of the base or may be disposed on a middle portion of the base. The projections may be disposed uniformly over the entirety of the first major surface of the base or may be disposed on one or more specific regions of the first major surface.

The positive electrode current collector may further include a side wall that is provided along the perimeter of the first major surface of the base and which projects toward the negative electrode. The height of the side wall may be greater than the height of the projections. The side wall can further reduce the pressure applied to the porous layer. In addition, the side wall prevents breakage of the projections. Consequently, the positive electrode current collector including such a side wall can realize further improvement in discharge capacity because the pores within the porous layer are retained more reliably.

Figure 2:
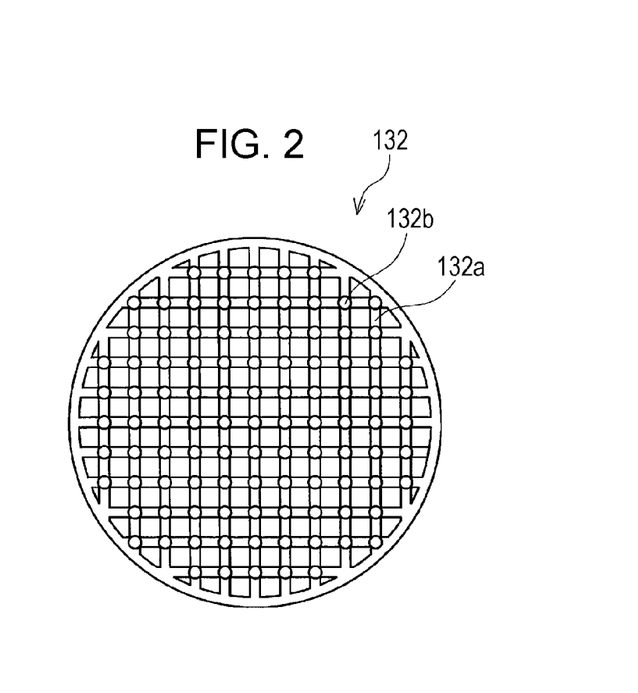
FIG. 2 is a plan view schematically illustrating an example of a current collector of a positive electrode for an air battery according to the present disclosure.

FIG. 2 illustrates an example of a configuration of the positive electrode current collector. FIG. 2 is a schematic plan view of the example of the current collector 132, illustrated in FIG. 1. In the positive electrode current collector 132 illustrated in FIG. 2, the base 132a includes openings. The projections 132b are disposed on regions other than the openings in the base 132a. In the example illustrated in FIG. 2, the base 132a is in the form of a grid, and the projections 132b are disposed on the grid intersection points. Furthermore, the outer perimeter of the transverse cross section of the base 132a is circular. Here, the transverse cross section is a cross section perpendicular to the stacking direction of the base 132a and the porous layer 131. However, this is an example of the positive electrode current collector 132, and the shape of the base 132a and the shape and location of the projections are not limited to this. The outer perimeter of the transverse cross section of the base 132a may, for example, have a shape other than a circular shape, such as a quadrilateral shape. Furthermore, the shape of the openings of the base 132a is not limited to the quadrilateral shape illustrated in FIG. 2 and may be, for example, a rhombic shape or the like. The shape of the projections 132b illustrated in FIG. 2 is a cylinder, but the shape is not limited to this. The shape may be a prism, such as a triangular prism or a quadrilateral prism, or may be a cone or pyramid or a frustum. Furthermore, it is sufficient that the regions where the projections 132b are to be disposed be regions other than the openings in the base 132a, and therefore the regions may be regions other than the grid intersection points.

Figure 3:
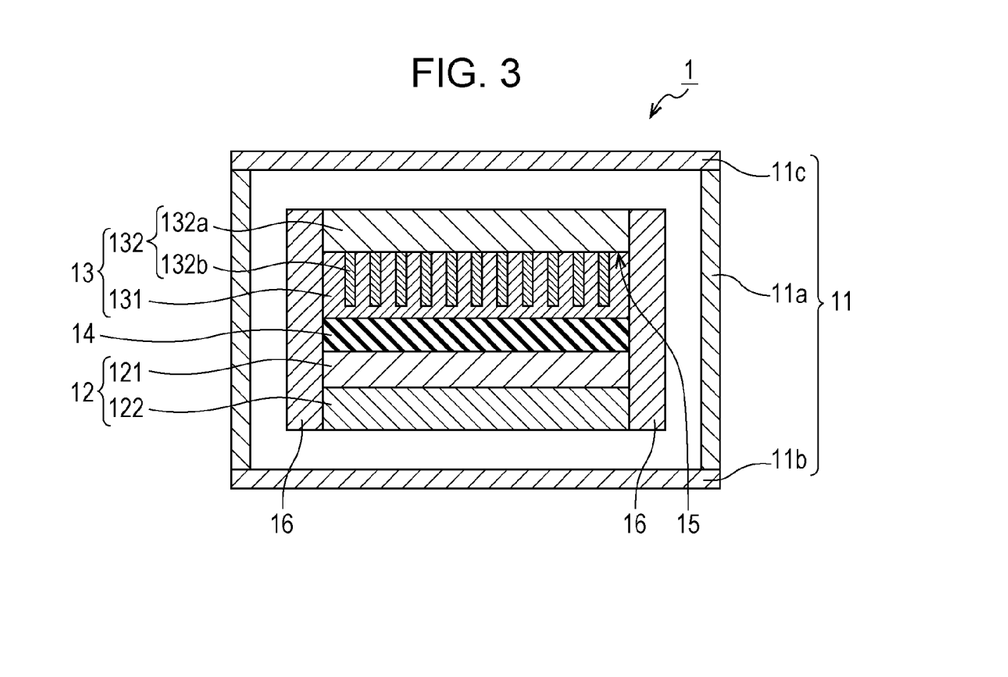
FIG. 3 is a schematic cross-sectional view illustrating another exemplary configuration of an air battery according to the present disclosure, which includes another example of a positive electrode for an air battery according to the present disclosure.
Figure 4:
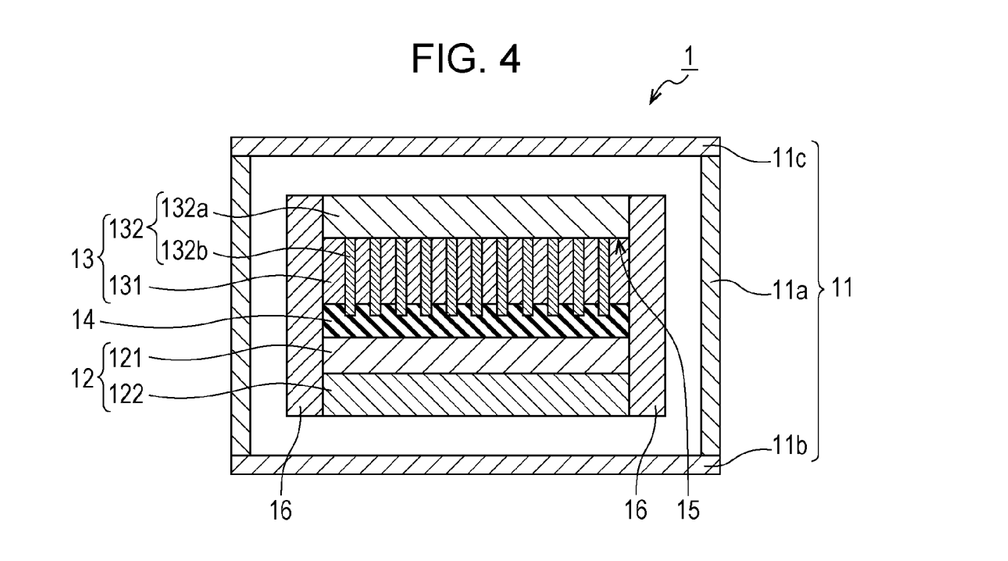
FIG. 4 is a schematic cross-sectional view illustrating another exemplary configuration of an air battery according to the present disclosure, which includes another example of a positive electrode for an air battery according to the present disclosure.

In the example illustrated in FIG. 1, the height of the projections 132b is approximately equal to the thickness of the porous layer 131. As illustrated in FIG. 3, however, the height of the projections 132b may be smaller than the thickness of the porous layer 131. Furthermore, as illustrated in FIG. 4, the height of the projections 132b may be greater than the thickness of the porous layer 131, that is, the projections 132b may extend through and beyond the porous layer 131.

Figure 5:
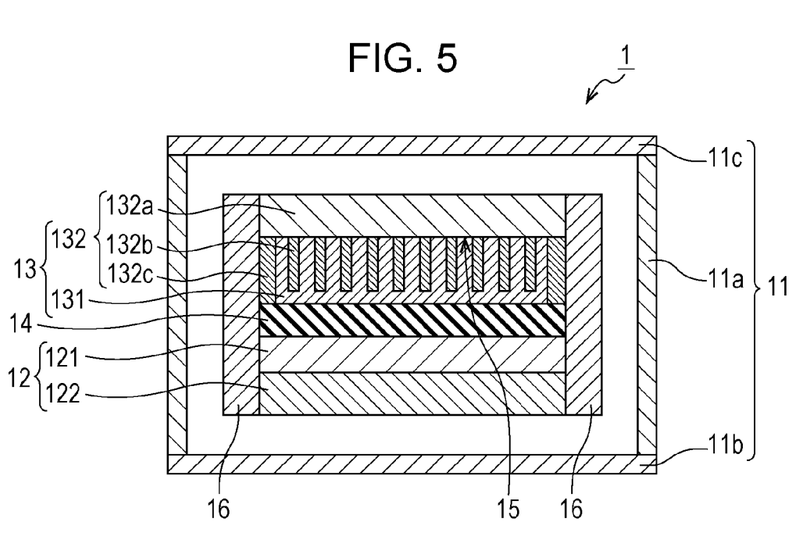
FIG. 5 is a schematic cross-sectional view illustrating another exemplary configuration of an air battery according to the present disclosure, which includes another example of a positive electrode for an air battery according to the present disclosure.

FIG. 5 illustrates an example of a configuration in which the above-described positive electrode current collector 132 further includes the side wall 132c. In this example, the side wall 132c is provided along the perimeter of the first major surface 15 of the base 132a and extends toward the negative electrode 12. The height of the side wall 132c is greater than the height of the projections 132b.

In the positive electrode current collector, porous layers may be disposed on both major surfaces of the base. That is, a porous layer that serves as a positive electrode layer may also be provided on the second major surface of the base, which is located opposite to the first major surface. In the case that porous layers are provided on both major surfaces of the base, a plurality of projections may also be provided on the second major surface of the base. Similarly to the projections provided on the first major surface, the projections provided on the second major surface may be in contact with the porous layer in the interior of the porous layer, which is disposed on the second major surface. The projections provided on the second major surface may be defined similarly to the projections provided on the first major surface described above.

In the case that the base of the positive electrode current collector includes openings, the air battery of the present embodiment may further include an additional positive electrode current collector (e.g., current collector in the form of a foil) for collecting electrical charge collected by the base including openings. In the present embodiment, a cell case, which will be described later, may have multiple functions to serve as such an additional positive electrode current collector.

The method for producing the positive electrode current collector is not particularly limited, and, for example, photo-etching or the like may be used.

2. Negative Electrode

As described above, the negative electrode includes a negative electrode layer and may further include a negative electrode current collector. The negative electrode layer and the negative electrode current collector will be described individually below.

(1) Negative Electrode Layer

The negative electrode layer of the present embodiment at least includes a negative electrode active material capable of occluding and releasing lithium ions. The negative electrode active material is not particularly limited provided that the material contains lithium metal. Examples of such materials include elemental lithium (lithium metal), lithium metal alloys, lithium metal oxides, and lithium metal nitrides. Examples of the lithium metal alloy include lithium aluminum alloys, lithium tin alloys, lithium lead alloys, and lithium silicon alloys. Examples of the lithium metal oxide include lithium titanium oxides. Examples of the lithium metal nitride include lithium cobalt nitrides, lithium iron nitrides, and lithium manganese nitrides.

The negative electrode layer may include a negative electrode active material alone or may include a binder as well as the negative electrode active material. For example, in the case that the negative electrode active material is in the form of a foil, the negative electrode layer may include the negative electrode active material alone. On the other hand, in the case that the negative electrode active material is in the form of a powder, the negative electrode layer may include the negative electrode active material and a binder. The binder may be a material known in the art as a binder for a negative electrode layer of a lithium-air battery. Examples of such materials include PVDFs and PTFEs. Although not particularly limited, the content of the binder in the negative electrode layer may be, for example, within a range of 1 mass % to 40 mass %. Furthermore, examples of methods for forming the negative electrode layer by using a negative electrode active material in the form of a powder include doctor blade methods and forming methods using a pressure-bonding method as with the above-described method for forming the porous layer.

(2) Negative Electrode Current Collector

The negative electrode current collector collects current from the negative electrode layer. The material of the negative electrode current collector is not particularly limited provided that the material is electrically conductive, and therefore the material may be a material known in the art as a material for a negative electrode current collector of an air battery. Examples of the material of the negative electrode current collector include copper, stainless steel, nickel, and carbon. Examples of the shape of the negative electrode current collector include foil forms, sheet forms, and mesh (e.g., grid) forms. In the present embodiment, the cell case, which will be described later, may have multiple functions to serve as a negative electrode current collector.

3. Separator

The lithium-air battery of the present embodiment may include a separator disposed between the positive electrode and the negative electrode. When a separator is disposed between the positive electrode and the negative electrode, a highly safe cell can be obtained. The separator is not particularly limited provided that the separator has a function of electrically separating the porous layer from the negative electrode layer. The separator may include, for example, a porous insulating material. Examples of the porous insulating material include porous membranes each including, for example, polyethylene (PE) or polypropylene (PP), resin nonwoven fabrics each including, for example, PE or PP, nonwoven glass fiber fabrics, and nonwoven paper fabrics.

The separator may have a porosity within a range of 30% to 90%. In the case that the electrolyte is to be held by the separator, if the porosity is less than 30%, it may be difficult for the separator to hold the electrolyte sufficiently. On the other hand, if the porosity is greater than 90%, the separator may not have sufficient strength. The porosity of the separator may be 35% to 60%.

The separator may be disposed at least partially within the electrolyte. In such a case, at least one or more of the plurality of projections of the positive electrode current collector may be in direct contact with the separator.

4. Electrolyte

The electrolyte is disposed between the positive electrode and the negative electrode and transports lithium ions. Accordingly, the form of the electrolyte is not particularly limited provided that the electrolyte is lithium ion-conductive (lithium ion conductor). The electrolyte may be a solution system or a solid membrane system. Representative examples of the solution system include organic solvent systems each including a lithium salt. Representative examples of the solid membrane system include solid polymer electrolyte systems each including a lithium salt.

In the case that the electrolyte is a solution system, a non-aqueous electrolyte solution prepared by dissolving a lithium salt in a non-aqueous solvent may be used as the electrolyte.

Examples of lithium salts that may be included in the non-aqueous electrolyte solution include lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), and lithium bis(trifluoromethanesulfonyl)amide ($LiN(CF_3SO_2)_2$); however, the lithium salt is not limited to these and may be a lithium salt known in the art as an electrolyte for a non-aqueous electrolyte solution of an air battery.

The amount of dissolution of the electrolyte in a non-aqueous solvent is, for example, 0.5 mol/L to 2.5 mol/L. In the case that a solution system electrolyte (non-aqueous electrolyte solution) is used, the non-aqueous electrolyte solution may be impregnated into the separator to be held by the separator, as described above, so that the electrolyte can be formed.

The non-aqueous solvent may be a non-aqueous solvent known in the art as a non-aqueous solvent for a non-aqueous electrolyte solution of an air battery. The solvent may be, among others, a chain ether, such as tetraethylene glycol dimethyl ether. This is because chain ethers are not susceptible to a side reaction, other than the oxidation-reduction reaction of oxygen, in the positive electrode compared with carbonate-based solvents.

5. Cell Case

The cell case for the air battery of the present embodiment is not particularly limited provided that the cell case can house the positive electrode, the negative electrode, and the electrolyte, described above. Thus, the cell case for the air battery of the present embodiment is not limited to the cell case 11 illustrated in FIG. 1 and may be a cell case of any of a variety of types, such as a coin type, a flat sheet type, a cylindrical type, and a laminate type. The cell case may be a cell case of an open-to-air type or may be a cell case of a sealed type. The open-to-air-type cell case is a case that has an air opening through which air can flow in and out and thus allows air to contact the positive electrode. On the other hand, in the instance that the case is a sealed-type cell case, the sealed-type cell case may be provided with a gas (e.g., air) supply tube and a gas (e.g., air) discharge tube. In such an instance, the gas to be supplied and discharged may be dry gas. The gas may have a high oxygen concentration or may be pure oxygen (99.999%). The oxygen concentration may be increased during discharging and the oxygen concentration may be reduced during charging.

As described above, in the present embodiment, the detailed description refers to an example in which the air battery is a lithium-air battery; however, the air battery of the present disclosure may be employed as an air battery using a different metal, for example, as a sodium-air battery or a magnesium-air battery.

EXAMPLE

The present disclosure will now be described in more detail with reference to examples. The positive electrodes and air batteries described below, which were prepared as samples, are examples. The present disclosure is not limited to the positive electrodes and air batteries described below.

First, each of the evaluations performed on the samples will be described. Specifically, the method for conducting the discharge test on the air battery, the method for calculating the gravimetric energy density, the method for measuring the porosity of the porous layer, and the method for measuring the pore diameter distribution, the first pore volume, and the second pore volume of the porous layer will be specifically described below.

Discharge Test

After the air battery was held under an atmosphere of oxygen for 20 minutes or more, the discharge test was conducted. For the test, the current density was 0.1 mA/cm$^2$ and the discharge cut-off voltage was 2.0 V. The results are shown in Tables 1 and 2. For the discharge capacity, the measured discharge capacity is shown, and the capacity per unit area of the porous layer is also shown. For samples 1-1 to 1-5, the capacity per unit weight of the porous layer is also shown. The capacity per unit area of the porous layer and the capacity per unit weight of the porous layer were calculated using the apparent area of the porous layer, according to the following equations. The apparent area of the porous layer of samples 1-1 to 1-5 and samples 2-1 to 2-12 was 1.33 cm$^2$.

Discharge capacity per unit area (mAh/cm$^2$)=discharge capacity÷apparent area of porous layer Discharge capacity per unit weight (mAh/g)=discharge capacity÷weight of porous layer Gravimetric Energy Density The average discharge voltage is defined as the average of the voltages measured from the start to the end of the discharge test. In the positive electrode after the discharge test on the air battery, the discharge capacity per unit weight of the porous layer (mAh/g) was determined. The gravimetric energy density (Wh/kg) was calculated by multiplying the average discharge voltage (V) by the discharge capacity per unit weight (mAh/g).

Porosity of Porous Layer

The porosity of the porous layer was determined according to the following equation using the apparent volume of the porous layer (thickness×apparent area, of porous layer), the mass of the porous layer, and the true density of the material that forms the porous layer. The apparent area of the porous layer is the area determined by the outer perimeter of the major surface of the porous layer. The area does not exclude the areas of the pores included in the major surface.

Porosity (%)=100×{(thickness×apparent area, of porous layer)−(weight of porous layer÷true density of material of porous layer)}÷(thickness×apparent area, of porous layer)

Pore Diameter Distribution, First Pore Volume, and Second Pore Volume

The pore diameter distribution of the porous layer was measured and the first pore volume and the second pore volume were determined, by mercury porosimetry.

Next, each of the samples will be described.

Sample 1-1

KETJENBLACK EC600JD, available from Lion Specialty Chemicals Co., Ltd., was used as a material for forming the carbon-containing electroconductive porous member. The Ketjen black, Newcol 1308-FA (90), which is a surfactant solution manufactured by Nippon Nyukazai Co., Ltd., and Fumaric acid, manufactured by NIPPON SHOKUBAI CO., LTD., were mixed together and stirred to obtain a mixture. Fumaric acid was used as a sublimation powder that served as a pore-forming agent. The fumaric acid was ground into a powder form in advance in a jet mill and used as a sublimation powder. The mass ratio between the Ketjen black and the sublimation powder was 7.7:33, respectively. The resultant mixture was cooled, and thereafter Fluon (registered trademark) PTFE AD AD911E, manufactured by Asahi Glass Co., Ltd., which was used as a binder, was added to the mixture, which was then stirred again. The binder was added in an amount such that the mass ratio between the Ketjen black and the binder was 7:3, respectively. The resultant mixture was rolled in a roll press to prepare a sheet. The resultant sheet was fired at 320° C. in a firing furnace to remove water, the surfactant, and the sublimation powder. The sheet was rolled in the roll press again to adjust the thickness to 200 μm to form a porous layer.

The positive electrode current collector used was a structure made of SUS316. The structure included a base having openings and a plurality of projections disposed on a first major surface of the base. The outer perimeter shape of the base was circular, and the thickness of the base was 100 μm. The projections extended in a direction perpendicular to the first major surface of the base. Each of the projections was a cylinder having a height of 200 μm and having a bottom surface that is circular and 200 μm in diameter. The plurality of projections were disposed such that the distance between adjacent projections was 1200 μm.

The porous layer described above was bonded to the first major surface of the base of the positive electrode current collector described above in such a manner that the projections of the positive electrode current collector extended into the porous layer. The resultant was used as the positive electrode. For this positive electrode, the ratio of the total area of the transverse cross sections of the plurality of projections to the area of the transverse cross section of the porous layer was determined. The ratio of the total area of the transverse cross sections of the projections to the area of the transverse cross section of the porous layer is shown in Table 1.

The non-aqueous electrolyte solution used was a solution prepared by dissolving lithium bis(trifluoromethanesulfonyl)amide (LiTFSA, manufactured by KISHIDA CHEMICAL Co., Ltd.), which was used as an electrolyte, in tetraethylene glycol dimethyl ether (TEGDME, manufactured by KISHIDA CHEMICAL Co., Ltd.), which was used as a non-aqueous solvent. The non-aqueous electrolyte solution was obtained by adding, to TEGDME, LiTFSA to obtain a solution with a concentration of 1 mol/L and stirring the resultant overnight in a dry air atmosphere with a dew point of −50° C. or lower for mixing and dissolution. The separator used was a glass fiber separator. Lithium metal (manufactured by The Honjo Chemical Corporation) was used as the negative electrode layer. A SUS304 mesh, which served as a negative electrode current collector, was bonded to the negative electrode layer, and the resultant was used as the negative electrode. The positive electrode, the separator, the non-aqueous electrolyte solution, and the negative electrode were arranged in a manner as illustrated in FIG. 1, and thus an air battery was prepared. The discharge test was conducted on the prepared air battery. The result of the discharge test on the air battery and the gravimetric energy density of the air battery are shown in Table 1.

Sample 1-2

A positive electrode and an air battery were prepared in a manner similar to that for sample 1-1 except that, for the positive electrode current collector, the diameter of the bottom surface of the projection cylinder was changed to 300 μm and the distance between adjacent projections was changed to 2400 μm. The ratio of the total area of the transverse cross sections of the projections to the area of the transverse cross section of the porous layer, the result of the discharge test on the air battery, and the gravimetric energy density of the air battery are shown in Table 1.

Sample 1-3

A positive electrode and an air battery were prepared in a manner similar to that for sample 1-1 except that, for the positive electrode current collector, the diameter of the bottom surface of the projection cylinder was changed to 300 µm. The ratio of the total area of the transverse cross sections of the projections to the area of the transverse cross section of the porous layer, the result of the discharge test on the air battery, and the gravimetric energy density of the air battery are shown in Table 1.

Sample 1-4

A positive electrode and an air battery were prepared in a manner similar to that for sample 1-1 except that the positive electrode current collector used was a structure provided without a plurality of projections, that is, a structure in which the base alone was provided. The results of the discharge test on the air battery and the gravimetric energy density of the air battery are shown in Table 1.

Sample 1-5

A positive electrode and an air battery were prepared in a manner similar to that for sample 1-1 except that a SUS304 mesh (177 µm thickness, 100 mesh) manufactured by The Nilaco Corporation was used as a positive electrode current collector. The results of the discharge test on the air battery and the gravimetric energy density of the air battery are shown in Table 1.

compared with the air batteries of samples 1-4 and 1-5, each of which was provided without projections.

These results confirmed that the use of a positive electrode current collector including projections enables realization of an air battery having both a high discharge capacity and a high gravimetric energy density.

Sample 2-1

KETJENBLACK EC600JD, available from Lion Specialty Chemicals Co., Ltd., and porous carbon CNovel P3, manufactured by Toyo Tanso Co., Ltd., were used as carbon materials for forming the carbon-containing porous member. KETJENBLACK EC600JD, CNovel P3, Newcol 1308-FA (90), which is a surfactant solution manufactured by Nippon Nyukazai Co., Ltd., and Fumaric acid, manufactured by NIPPON SHOKUBAI CO., LTD, were mixed together and stirred to obtain a mixture. Fumaric acid was used as a sublimation powder that served as a pore-forming agent. The fumaric acid was ground into a powder form in advance in a jet mill and used as a sublimation powder. The mass ratio between KETJENBLACK EC600JD, CNovel P3, and the sublimation powder was 4.4:3.3:33, respectively. The resultant mixture was cooled, and thereafter Fluon (registered trademark) PTFE AD AD911E, manufactured by Asahi Glass Co., Ltd., which was used as a binder, was added to the mixture, which was then stirred again. The binder was added in an amount such that the mass ratio between

TABLE 1

| Sample No. | Thickness of porous layer (µm) | Thickness of base (µm) | Distance between adjacent projections (µm) | Height of projection (µm) | Diameter of bottom surface of projection (cylinder) (µm) | Ratio of total area of transverse cross sections of plurality of projections to area of transverse cross section of porous layer (%) | Discharge voltage (V) | Discharge capacity (mAh) | Discharge capacity per unit area (mAh/cm$^2$) | Discharge capacity per unit weight (mAh/g) | Gravimetric energy density (Wh/kg) |
|---|---|---|---|---|---|---|---|---|---|---|---|
| 1 | 200 | 100 | 1200 | 200 | 200 | 2.8 | 2.71 | 29.7 | 22.3 | 936 | 2538 |
| 2 | 200 | 100 | 2400 | 200 | 300 | 3.1 | 2.70 | 27.0 | 20.3 | 918 | 2476 |
| 3 | 200 | 100 | 1200 | 200 | 300 | 6.4 | 2.69 | 27.1 | 20.4 | 919 | 2472 |
| 4 | 200 | 100 | — | — | — | — | 2.48 | 26.9 | 20.2 | 917 | 2272 |
| 5 | 200 | 177 | — | — | — | — | 2.70 | 21.6 | 16.2 | 871 | 2348 |

As demonstrated by the results shown above, the air batteries of samples 1-1 to 1-3, in each of which a positive electrode current collector provided with projections was used, enabled realization of a high discharge capacity and a high gravimetric energy density, compared with the air batteries of samples 1-4 and 1-5, in each of which a positive electrode current collector provided without projections was used. Even when the distance between adjacent projections and/or the diameter of the bottom surface of the projection were changed as in samples 1-1 to 1-3, air batteries provided with projections enabled realization of a high discharge capacity and a high gravimetric energy density, compared with the air batteries of samples 1-4 and 1-5, each of which was provided without projections.

Furthermore, to monitor the influence of the ratio of the total area of the transverse cross sections of the projections to the area of the transverse cross section of the porous layer, modified versions of samples 1-1 to 1-3, for each of which the ratio was changed, were prepared. All of the air batteries of modified samples 1-1 to 1-3 enabled realization of a high discharge capacity and a high gravimetric energy density, KETJENBLACK EC600JD and the binder was 7:3, respectively. The resultant mixture was rolled in a roll press to prepare a sheet. The resultant sheet was fired at 320° C. in a firing furnace to remove water, the surfactant, and the sublimation powder. The sheet was rolled in the roll press again to adjust the thickness to 200 µm, and thus a porous layer was obtained.

The positive electrode current collector used was a structure made of SUS316. The structure included a base having openings and a plurality of projections disposed on a first major surface of the base. The outer perimeter shape of the base was circular, and the thickness of the base was 100 µm. The projections extended in a direction perpendicular to the first major surface of the base. Each of the projections was a cylinder having a height of 200 µm and having a bottom surface that is circular and 300 µm in diameter. The plurality of projections were disposed such that the distance between adjacent projections was 1200 µm.

The porous layer described above was bonded to the first major surface of the base of the positive electrode current collector described above in such a manner that the projections of the positive electrode current collector extended into the porous layer. The resultant was used as the positive electrode. For this positive electrode, the ratio of the total area of the transverse cross sections of the plurality of projections to the area of the transverse cross section of the porous layer was determined. The ratio of the total area of the transverse cross sections of the projections to the area of the transverse cross section of the porous layer is shown in Table 2.

The non-aqueous electrolyte solution used was a solution prepared by dissolving lithium bis(trifluoromethanesulfonyl)amide (LiTFSA, manufactured by KISHIDA CHEMICAL Co., Ltd.), which was used as an electrolyte, in tetraethylene glycol dimethyl ether (TEGDME, manufactured by KISHIDA CHEMICAL Co., Ltd.), which was used as a non-aqueous solvent. The non-aqueous electrolyte solution was obtained by adding, to TEGDME, LiTFSA to obtain a solution with a concentration of 1 mol/L and stirring the resultant overnight in a dry air atmosphere with a dew point of −50° C. or lower for mixing and dissolution. The separator used was a glass fiber separator. Lithium metal (manufactured by The Honjo Chemical Corporation) was used as the negative electrode layer. A SUS304 mesh (manufactured by The Nilaco Corporation), which served as a negative electrode current collector, was bonded to the negative electrode layer, and the resultant was used as the negative electrode. The positive electrode, the separator, the non-aqueous electrolyte solution, and the negative electrode were arranged in a manner as illustrated in FIG. 1, and thus an air battery was prepared. The discharge test was conducted on the prepared air battery. The results of the discharge test on the air battery are shown in Table 2. Table 2 also shows the presence or absence of projections in the current collector, the ratio of the total area of the transverse cross sections of the projections to the area of the transverse cross section of the porous layer, and the porosity, the first pore volume, the second pore volume of the porous layer.

Sample 2-2

A porous layer was prepared in a manner similar to that for sample 2-1 except that KETJENBLACK EC600JD alone was used as the carbon material and the mass ratio between KETJENBLACK EC600JD and the sublimation powder was 7.7:33, respectively. A positive electrode and an air battery were prepared in a manner similar to that for sample 2-1 except that the porous layer prepared as described above was used. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-3

A porous layer was prepared in a manner similar to that for sample 2-1 except that KETJENBLACK EC600JD and carbon fibers VGCF, manufactured by SHOWA DENKO K.K. were used as the carbon material and the mass ratio between KETJENBLACK EC600JD, carbon fibers VGCF, and the sublimation powder was 4.4:3.3:33, respectively. A positive electrode and an air battery were prepared in a manner similar to that for sample 2-1 except that the porous layer prepared as described above was used. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-4

A porous layer was prepared in a manner similar to that for sample 2-1 except that KETJENBLACK EC600JD alone was used as the carbon material and the mass ratio between KETJENBLACK EC600JD and the sublimation powder was 7.7:22, respectively. A positive electrode and an air battery were prepared in a manner similar to that for sample 2-1 except that the porous layer prepared as described above was used. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-5

A porous layer was prepared in a manner similar to that for sample 2-1 except that KETJENBLACK EC600JD alone was used as the carbon material and no sublimation powder was used. A positive electrode and an air battery were prepared in a manner similar to that for sample 2-1 except that the porous layer prepared as described above was used. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-6

The porous layer prepared for sample 2-4 was used as the porous layer for sample 2-6. Furthermore, a modification of sample 2-1 in which the diameter of the bottom surface of the projection cylinder of the positive electrode current collector was changed to 200 μm was used as the positive electrode current collector for sample 2-6. A positive electrode and an air battery were prepared in a manner similar to that for sample 2-1 except that such a porous layer and such a positive electrode current collector were used. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-7

The porous layer prepared for sample 2-5 was used as the porous layer for sample 2-7. Furthermore, a modification of sample 2-1 in which the diameter of the bottom surface of the projection cylinder of the positive electrode current collector was changed to 200 μm was used as the positive electrode current collector for sample 2-7. A positive electrode and an air battery were prepared in a manner similar to that for sample 2-1 except that such a porous layer and such a positive electrode current collector were used. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-8

A positive electrode and an air battery were prepared in a manner similar to that for sample 2-1 except that a SUS304 mesh (177 μm thickness, 100 mesh) manufactured by The Nilaco Corporation was used as a positive electrode current collector. That is, in the positive electrode of sample 2-8, the positive electrode current collector was provided without projections. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-9

A positive electrode and an air battery were prepared in a manner similar to that for sample 2-2 except that a SUS304 mesh (177 μm thickness, 100 mesh) manufactured by The Nilaco Corporation was used as a positive electrode current collector. That is, in the positive electrode of sample 2-9, the positive electrode current collector was provided without projections. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-10

A positive electrode and an air battery were prepared in a manner similar to that for sample 2-3 except that a SUS304 mesh (177 μm thickness, 100 mesh) manufactured by The Nilaco Corporation was used as a positive electrode current collector. That is, in the positive electrode of sample 2-10, the positive electrode current collector was provided without projections. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-11

A positive electrode and an air battery were prepared in a manner similar to that for samples 2-4 and 2-6 except that a SUS304 mesh (177 μm thickness, 100 mesh) manufactured by The Nilaco Corporation was used as a positive electrode current collector. That is, in the positive electrode of sample 2-11, the positive electrode current collector was provided without projections. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

Sample 2-12

A positive electrode and an air battery were prepared in a manner similar to that for samples 2-5 and 2-7 except that a SUS304 mesh (177 μm thickness, 100 mesh) manufactured by The Nilaco Corporation was used as a positive electrode current collector. That is, in the positive electrode of sample 2-12, the positive electrode current collector was provided without projections. Table 2 shows the presence or absence of projections in the current collector, the ratio of the total area of the transverse cross sections of the projections to the area of the transverse cross section of the porous layer, the porosity, the first pore volume, the second pore volume of the porous layer, and the result of the discharge test on the air battery.

TABLE 2

| Sample No. | Structure of current collector | | Structure of porous layer | | | Discharge capacity mAh | Discharge capacity per unit area mAh/cm$^2$ |
|---|---|---|---|---|---|---|---|
| | Projection | Ratio of total area of transverse cross sections of plurality of projections to area of transverse cross section of porous layer % | Porosity % | First pore volume cm$^3$/g | Second pore volume cm$^3$/g | | |
| 1 | Present | 6.4 | 89.3 | 0.94 | 2.46 | 29.4 | 22.1 |
| 2 | Present | 6.4 | 88.8 | 1.05 | 2.99 | 27.1 | 20.4 |
| 3 | Present | 6.4 | 88.7 | 0.59 | 2.62 | 23.8 | 17.9 |
| 4 | Present | 6.4 | 86.6 | 1.18 | 2.11 | 22.2 | 16.7 |
| 5 | Present | 6.4 | 83.3 | 1.29 | 1.20 | 19.3 | 14.5 |
| 6 | Present | 2.8 | 86.6 | 1.18 | 2.11 | 29.8 | 22.4 |
| 7 | Present | 2.8 | 83.3 | 1.29 | 1.20 | 20.0 | 15.0 |
| 8 | Absent | 0 | 89.3 | 0.94 | 2.46 | 16.8 | 12.6 |
| 9 | Absent | 0 | 88.8 | 1.05 | 2.99 | 21.7 | 16.3 |
| 10 | Absent | 0 | 88.7 | 0.59 | 2.62 | 16.8 | 12.6 |
| 11 | Absent | 0 | 86.6 | 1.18 | 2.11 | 22.1 | 16.6 |
| 12 | Absent | 0 | 83.3 | 1.29 | 1.20 | 22.6 | 17.0 |

As can be seen from the results of samples 2-8 to 2-12 shown in Table 2, the discharge capacity of the air battery, in which a positive electrode current collector without projections was used, was not proportional to the porosity of the porous layer of the positive electrode. On the other hand, of the samples in which a positive electrode current collector including projections was used, samples 2-1 to 2-5 were compared with one another. Samples 2-1 to 2-5 had the same ratio of the total area of the transverse cross sections of the projections to the area of the transverse cross section of the porous layer. It was found that, regarding the air batteries of samples 2-1 to 2-5, the discharge capacity was improved in proportion to the porosity. In the positive electrodes of samples 2-8 to 2-12, in each of which a positive electrode current collector without projections was used, it is believed that, when a porous film having a desired pore diameter was pressure-bonded onto the positive electrode current collector, the pores within the porous film partially disappeared, and as a result, the porosity of the resulting porous layer changed. Consequently, it is believed that, in the air batteries of samples 2-8 to 2-12, the discharge capacity and the porosity were not in a proportional relationship. In contrast, in samples 2-1 to 2-5, in each of which a positive electrode current collector including projections was used, it is thought that, even when a porous film having a desired pore diameter was pressure-bonded onto the positive electrode current collector, disappearance of pores within the porous film was reduced because the positive electrode current collector included projections, and as a result, the discharge capacity and the porosity were in a proportional relationship.

A comparison was made between samples 2-5, 2-7, and 2-12. In these samples, the porous layers used had the same porosity, and the porosity was below 86%. The comparison revealed that the discharge capacity of the air battery of sample 2-12, in which a commercial metal mesh without projections was used as the current collector, was higher than the discharge capacities of the air batteries of samples 2-5 and 2-7, in each of which a positive electrode current collector including projections was used. The reason for this is believed to be that the reduction in discharge capacity due to disappearance of pores as a result of pressure bonding in the case of using a current collector without projections was smaller than the reduction in discharge capacity due to disappearance of pores in the regions where the projections were formed in the current collector.

Samples in which the porous layers used had the same porosity and the porosity was not less than 86% were compared with each other. Specifically, comparisons were made between sample 2-1 and sample 2-8, between sample 2-2 and sample 2-9, between sample 2-3 and sample 2-10, and between sample 2-4, sample 2-6, and sample 2-11. The comparisons revealed that the air batteries in which a positive electrode current collector including projections was used had discharge capacities higher than those of the air batteries in which a commercial metal mesh without projections was used as the current collector.

Although not shown in Table 2, regarding the discharge capacity per unit weight (mAh/g), too, when a comparison was made between positive electrodes in which the porous layers had the same porosity, the positive electrode that included a porous layer and a positive electrode current collector including projections had a discharge capacity higher than that of the positive electrode that included a porous layer and a current collector without projections, provided that the porosity was not less than 86%.

As described above, in the case where porous layers had the same porosity and the porosity was not less than 86%, the positive electrode that included a porous layer and a positive electrode current collector including projections had a discharge capacity higher than that of the positive electrode that included a porous layer and a positive electrode current collector without projections.

As demonstrated by the results described above, the positive electrode that includes a current collector including projections and a porous layer having a porosity of 86% or greater and 99% or less makes it possible to obtain an air battery that enables realization of a high discharge capacity per unit area.

The air battery of the present disclosure has a high discharge capacity and a high gravimetric energy density. Hence, the air battery of the present disclosure is useful as a high-capacity cell.

What is claimed is:

1. A positive electrode for an air battery, the positive electrode comprising:
    a current collector; and
    a porous layer including an electroconductive material, wherein
    the current collector includes:
        a base having a first major surface; and
        a plurality of projections disposed on at least the first major surface of the base,
    the first major surface of the base is a planar surface,
    the porous layer is disposed on the first major surface of the base and is in direct contact with the first major surface,
    the projections are in direct contact with the porous layer in an interior of the porous layer,
    the current collector further includes a side wall provided along a perimeter of the first major surface of the base, and
    a height of the side wall is greater than a height of the projections.

2. The positive electrode according to claim 1, wherein the base includes at least one opening, and
    the projections are disposed on regions other than the opening on the first major surface.

3. The positive electrode according to claim 1, wherein the porous layer has a porosity of 86% or greater and 99% or less.

4. The positive electrode according to claim 1, wherein
    the porous layer includes first pores each having a pore diameter of 4 nm or greater and less than 100 nm and second pores each having a pore diameter of 100 nm or greater and 10 μm or less, and
    a second pore volume is greater than a first pore volume, the second pore volume being a cumulative pore volume of the second pores, the first pore volume being a cumulative pore volume of the first pores.

5. The positive electrode according to claim 4, wherein the first pore volume is 0.59 $cm^3/g$ or greater and less than 2.99 $cm^3/g$.

6. The positive electrode according to claim 1, wherein the porous layer includes a carbon material as the electroconductive material and a polymeric material.

7. The positive electrode according to claim 1, wherein a total area of transverse cross sections of the plurality of projections is 2.0% or greater and 7.0% or less of an area of a transverse cross section of the porous layer,
    where the total area of the transverse cross sections of the projections is equal to a sum of areas of respective cross sections of the plurality of projections taken along a plane perpendicular to a stacking direction of the base of the current collector and the porous layer, and the area of the transverse cross section of the porous layer is equal to an area determined by an outer perimeter of a cross section of the porous layer taken along the plane.

8. The positive electrode according to claim 1, wherein the projections extend through and beyond the porous layer.

9. An air battery comprising:
    a positive electrode for an air battery;
    a negative electrode that occludes and releases metal ions; and an electrolyte filling a space between the positive electrode and the negative electrode, wherein
the positive electrode comprising:
a current collector; and
a porous layer including an electroconductive material, wherein
the current collector includes:
 a base having a first major surface; and
 a plurality of projections disposed on at least the first major surface of the base,
the first major surface of the base is a planar surface,
the porous layer is disposed on the first major surface of the base and is in direct contact with the first major surface,
the projections are in direct contact with the porous layer in an interior of the porous layer,
the current collector further includes a side wall provided along a perimeter of the first major surface of the base, and
a height of the side wall is greater than a height of the projections.

10. The air battery according to claim 9, further comprising a separator disposed between the positive electrode and the negative electrode, the separator being disposed at least partially within the electrolyte, at least one or more of the plurality of projections being in direct contact with the separator.

11. The air battery according to claim 9, wherein the electrolyte comprises a non-aqueous electrolyte solution.

* * * * *